(12) United States Patent
Hornstein et al.

(10) Patent No.: US 11,256,214 B2
(45) Date of Patent: Feb. 22, 2022

(54) SYSTEM AND METHOD FOR LIGHTFIELD CAPTURE

(71) Applicant: Looking Glass Factory, Inc., Brooklyn, NY (US)

(72) Inventors: Alex Hornstein, Brooklyn, NY (US); Evan Moore, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/073,927

(22) Filed: Oct. 19, 2020

(65) Prior Publication Data

US 2021/0116864 A1 Apr. 22, 2021

Related U.S. Application Data

(60) Provisional application No. 62/916,976, filed on Oct. 18, 2019, provisional application No. 63/007,790, filed on Apr. 9, 2020.

(51) Int. Cl.
*G03H 1/04* (2006.01)
*H04N 5/247* (2006.01)
*H04N 7/18* (2006.01)
*G06T 3/00* (2006.01)
*H04N 5/225* (2006.01)

(52) U.S. Cl.
CPC .......... *G03H 1/0443* (2013.01); *G06T 3/0006* (2013.01); *H04N 5/247* (2013.01); *H04N 7/181* (2013.01); *G03H 2001/0452* (2013.01); *H04N 5/2252* (2013.01); *H04N 5/2253* (2013.01)

(58) Field of Classification Search
CPC ......... G03H 1/0443; G03H 2001/0452; H04N 7/181; G06T 3/0006
See application file for complete search history.

(56) References Cited

U.S. PATENT DOCUMENTS

| | | | |
|---|---|---|---|
| 7,916,934 B2* | 3/2011 | Vetro | H04N 13/111 382/154 |
| 8,798,387 B2* | 8/2014 | Yamada | G06T 5/006 382/254 |
| 9,165,401 B1 | 10/2015 | Kim et al. | |
| 9,179,126 B2* | 11/2015 | El-Ghoroury | H04N 5/23206 |
| 2008/0043095 A1* | 2/2008 | Vetro | H04N 19/597 348/51 |
| 2008/0187305 A1* | 8/2008 | Raskar | G02B 27/0075 396/268 |
| 2012/0281922 A1* | 11/2012 | Yamada | G06T 7/246 382/201 |
| 2013/0147790 A1 | 6/2013 | Hildreth et al. | |

(Continued)

OTHER PUBLICATIONS

"The (New) Stanford Light Field Archive, Computer Graphics Laboratory, Stanford University", http://lightfield.stanford.edu/acq.html#array.

(Continued)

*Primary Examiner* — Boubacar Abdou Tchoussou
(74) *Attorney, Agent, or Firm* — Jeffrey Schox; Randy Mehlenbacher

(57) ABSTRACT

A system for generating holographic images or videos comprising a camera array, a plurality of processors, and a central computing system. A method for generating holographic images can include receiving a set of images and processing the images.

19 Claims, 9 Drawing Sheets

(56) References Cited

U.S. PATENT DOCUMENTS

| | | | |
|---|---|---|---|
| 2013/0242051 | A1 | 9/2013 | Balogh |
| 2013/0321581 | A1* | 12/2013 | El-Ghoroury ............ H04N 5/04 348/46 |
| 2016/0105658 | A1 | 4/2016 | Choo et al. |
| 2017/0078577 | A1 | 3/2017 | Wakamatsu |
| 2017/0102671 | A1* | 4/2017 | Damm .................. G03B 35/10 |
| 2017/0295357 | A1 | 10/2017 | Yang |
| 2019/0222821 | A1* | 7/2019 | Graziosi ............. H04N 13/172 |
| 2019/0226830 | A1 | 7/2019 | Edwin et al. |
| 2019/0388193 | A1* | 12/2019 | Saphier ................ A61B 1/0615 |
| 2019/0388194 | A1* | 12/2019 | Atiya ..................... A61C 9/006 |
| 2020/0314415 | A1* | 10/2020 | Karafin ................ H04N 13/363 |

OTHER PUBLICATIONS

Balough, Tibor, et al., "Real-time 3D light field transmission", Proceedings of SPIE—The International Society for Optical Engineering, Apr. 2010.

Cserkaszky, Aron, et al., "Light-Field Capture and Display Systems: limitations, challenges, and potentials", https://researchgate.net/publication/327285597, Conference Paper, Aug. 2018.

Kovacs, Peter Tamas, et al., "Architectures and Codecs for Real-Time Light Field Streaming", Journal of Imaging Science and Technology, Jan. 2017.

Kovacs, Peter Tamas, "Light-Field Displays: Technology and Representation of 3D Visual information", Holografika, JPEG Pleno Workshop, Warsaw, Poland, Jun. 23, 2015.

Matusik, Wojciech, et al., "3D TV: A Scalable System for Real-Time Acquisition, Transmission, and Autostereoscopic Display of Dynamic Scenes", https://citeseerx.ist.psu.edu/viewdoc/download?doi=10.1.1.9.8587&rep=rep1&type=pdf.

Yang, Jason C., et al., "A Real-Time Distributed Light Field Camera", Eurographics Workshop on Rendering (2002), pp. 1-10.

International Search Report and Written Opinion for application No. PCT/US20/056307 dated Jan. 26, 2021.

\* cited by examiner

Reference line

SYSTEM AND METHOD FOR LIGHTFIELD CAPTURE

CROSS-REFERENCE TO RELATED APPLICATIONS

This application claims the benefit of U.S. Provisional Application No. 62/916,976, filed 18 Oct. 2019 and U.S. Provisional Application No. 63/007,790, filed 9 Apr. 2020, each of which is incorporated in its entirety by this reference.

TECHNICAL FIELD

This invention relates generally to the holographic display field, and more specifically to a new and useful system and method in the holographic display field.

BACKGROUND

Lightfield cameras have been developed for practical use over the past twenty years. These cameras have a variety of architectures, but all revolve around the common theme of capturing the direction and wavelength of a large number of light rays falling within the camera's view.

To date, lightfield framery is not processed in real-time. The process of taking imagery from multiple camera positions, aligning the imagery, and converting the data into a format for viewing or processing is extremely processor intensive and requires significant time to transfer and process the data, even with high end computers. Typically, each camera records a synchronized video file locally while the camera is recording, and after the recording is complete, the video files are transferred to a central storage location for processing. The bandwidth requirements for transferring image data and the compute requirements for processing the imagery from a lightfield camera array result in a significant delay, anywhere from minutes to hours, between filming with the camera and being able to view the resulting imagery. This delay in processing makes lightfield cameras challenging to use for filming, as there is no real-time viewfinder for a scene, a critical part of all modern photo and video shoots. Additionally, as lightfield displays become more common, the current delay prevents a lightfield webcam from becoming viable—it is impossible to view data from a lightfield camera in realtime at the recording location on a lightfield display or stream it to other remote lightfield displays.

Thus, there is a need in the holographic display field to create a new and useful system and method. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
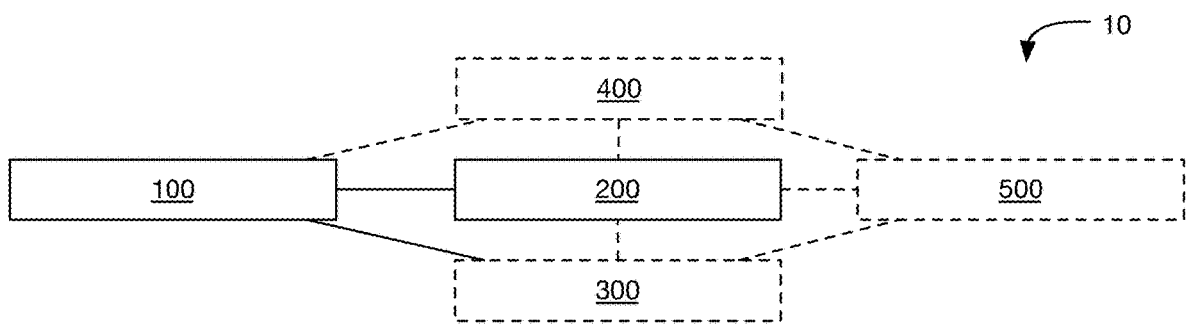
FIG. 1 is a schematic representation of the system.

As shown in FIG. 1, the system 10 can include a camera array 100 and one or more computing systems 200. The system can optionally include one or more displays 500, sensors 400, supports 300, and/or any suitable components.

Figure 2:
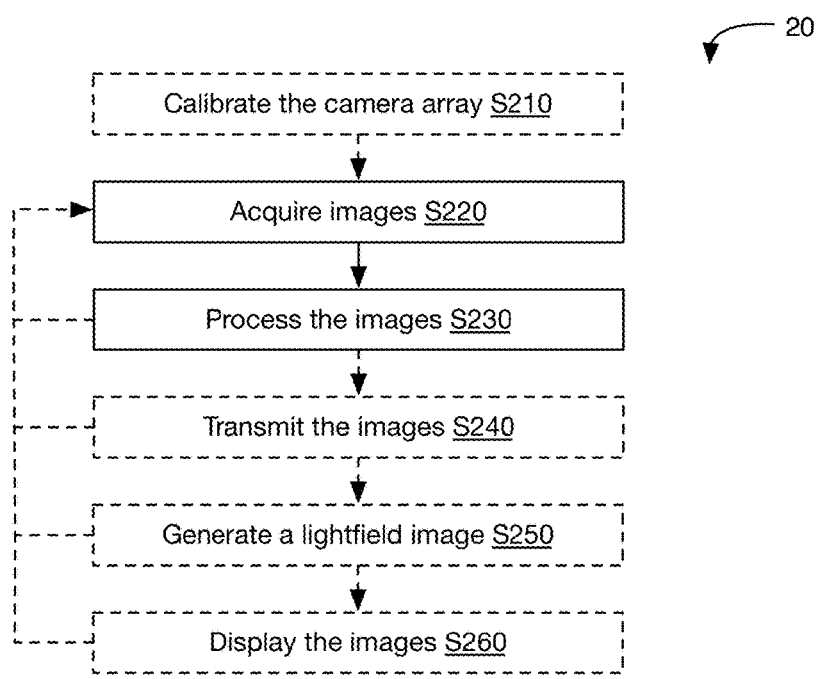
FIG. 2 is a schematic representation of the method.

As shown in FIG. 2, the method 20 can include acquiring images S220 and processing the images S230. The method can optionally include calibrating the camera array S210, transmitting the images S240, generating a lightfield frame S250, displaying the images S260, and/or any suitable steps.

The system and method can function to acquire one or more frames (e.g., images, views) of a scene and convert the frames to a frame of a lightfield video (and/or to a lightfield frame). The lightfield frame can include (e.g., be made of) any suitable number of views between 1-250 such as 2, 4, 8, 45, and 135; but can include any suitable number of views. Each view is preferably collected from a different position (e.g., shows the scene from different perspectives, shows the scene from overlapping perspectives, etc.), but can be collected from the same location. The lightfield frame can be used to display a 3D holographic representation of the scene (e.g., a holographic image), display a 2D representation of the scene, store a 3D video of the scene, capture a 3D representation of the scene, and/or be used for any purpose.

In specific examples, the system and/or method can be used for telecommunications (e.g., as a means for capturing and sharing live video of one or more users at remote locations), live photography (e.g., to capture and display real time video of wildlife in their natural habitat), surveillance, sporting events, geographic surveying, and/or any suitable application.

Figure 8:
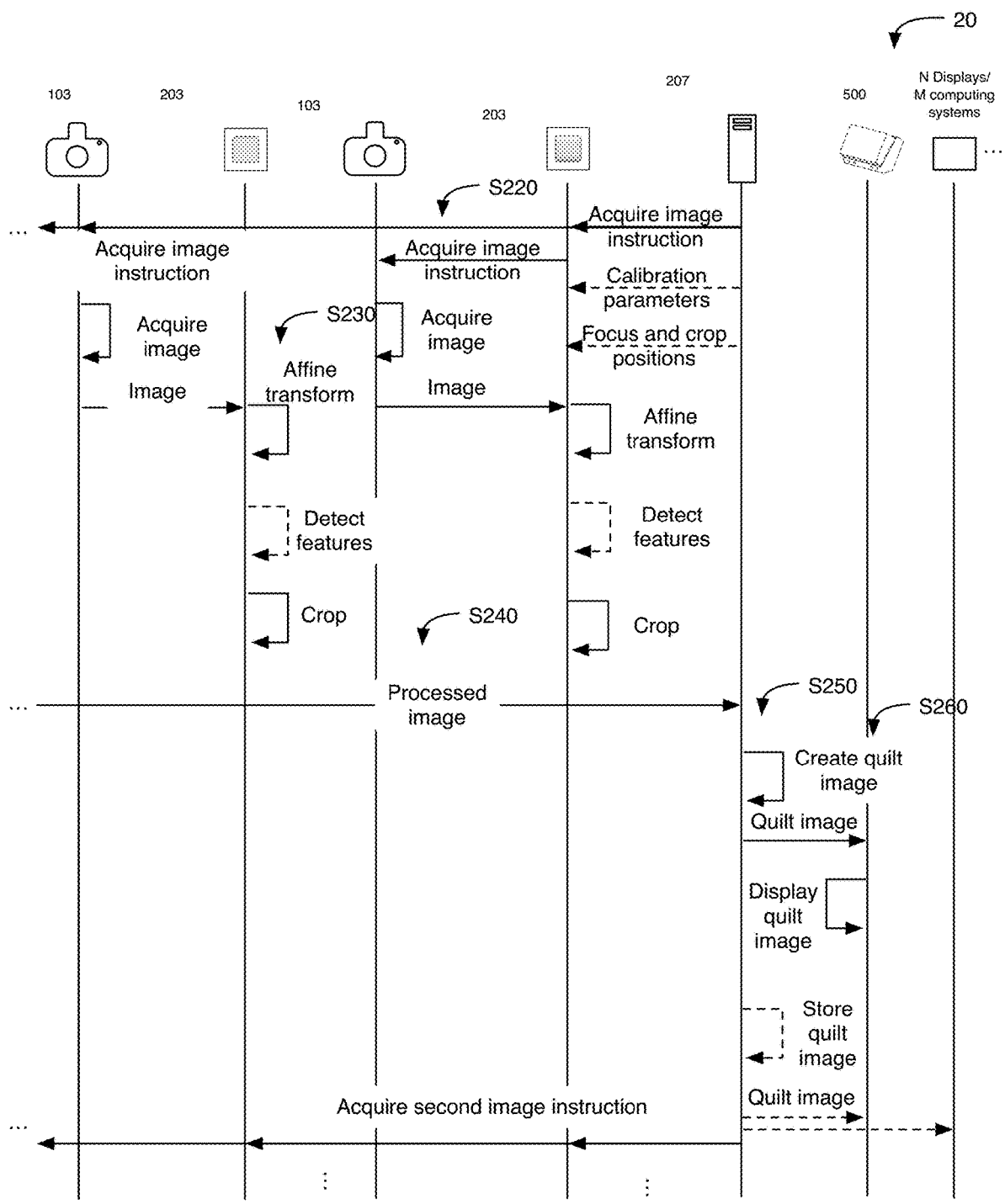
FIG. 8 is a schematic representation of an example of an embodiment of the method.

In an illustrative example, as shown for example in FIG. 8, the method can include: receiving a frame corresponding to each camera of a camera array, where the frames are captured concurrently; transforming each frame at a camera computing system associated with the respective camera; selecting a segment of each frame; transmitting the segments of every frame to a central computing system, and generating a lightfield frame from the segments of every frame. The segment of each frame is preferably associated with a feature of the scene captured by the frames. The lightfield frame is preferably generated before a second frame is captured at each camera. However, the method can include any suitable steps.

2. Benefits.

Variations of the technology can confer several benefits and/or advantages.

First, variants of the technology can enable real or near-real time capture and display of lightfield frames. For example, using a computing system that is distributed across a camera computing system and a central computing system can enable the real or near-real time capture and display of lightfield frames. In a specific example, a camera computing system can be associated with each camera of the camera array. The camera computing system can process the images acquired by the camera to decrease their size (e.g., the amount of memory required to store them, the amount of bandwidth required to transmit them, the number of pixels in the image, etc.), which can facilitate transferring the images to the central computing system faster than if the images were not processed. In this specific example, the central computing system can generate a lightfield frame and/or video from the processed frames on a frame by frame basis (e.g., generate a lightfield frame before frames associated with a subsequent lightfield frame have been acquired).

Second, variants of the technology can enable lightfield video (and/or images) to be transmitted over a wireless and/or wired network connection. In an illustrative example, when the lightfield frame includes 45 views, using unprocessed images to generate a lightfield frame (e.g., a single frame from the lightfield video) can result in file sizes in excess of 540 MB, whereas using processed images to generate a lightfield frame can result in file sizes less than 64 MB.

Third, variants of the technology can enable a user to determine a quality (e.g., a subjective quality such as subject captured, mood, facial expressions, subject positioning, etc.; an objective quality such as lighting, eyes open, blur, etc.) of a lightfield frame shortly after (e.g., immediately after, within 1 s, 2 s, 5 s, 10 s, 30 s, 1 min, 5 min, 10 min, etc.) capturing the lightfield frame (as opposed to waiting a significant amount of time to process and generate the lightfield frame). In specific examples, the distributed computing system between processing one or more image(s) at the camera computing system and generating a lightfield frame from the set of processed images at a central computing system can facilitate the user determining the quality of the lightfield frame.

However, variants of the technology can confer any other suitable benefits and/or advantages.

3. System.

The system 10 can include a camera array 100 and one or more computing systems 200. The system can optionally include one or more displays 500, sensors 400, supports 300, and/or any suitable components. The system functions to capture and process a set of images to generate a lightfield frame (e.g., of a lightfield video, a lightfield frame, etc.). Each lightfield frame preferably includes a set of images of a scene, where each image from the set of images is preferably taken from a different perspective (e.g., captured from a different location). For lightfield videos, each lightfield frame of the lightfield video preferably includes the same number of images, but can include a different number of images. The system can function to display, store, transmit, and/or otherwise use the lightfield frame(s).

The camera array preferably functions to capture visual data 109 of a scene, where the visual data can be used to generate a lightfield frame. The visual data can include images (e.g., photographs, still images), video (e.g., a time series of one or more images or frames), frame differences (e.g., determined using frame differencing methods), and/or other visual data. The images can be: still images, video frames, and/or other images. The visual data preferably include a set of images, where the set of images can include any number of images between 1-250 images, such as 2, 4, 8, 12, 20, 45, 50, 70, 90, 100, 135, 150. However, the set of images can include any suitable number of images. The set of images are preferably measured concurrently (e.g., synchronously), but can be measured contemporaneously, simultaneously, with predetermined timings, with random timings, and/or with any suitable timing. Each image of the set of images is preferably of a different perspective of the scene. Each set of images is preferably associated with a time and/or a time window, where subsequent times are associated with different sets of images.

The camera array preferably includes a set of cameras. The set of cameras preferably includes a number of cameras equal to the number of images in the set of images. However, the set of cameras can include more cameras (e.g., to provide redundancy, to provide additional views from different perspectives, etc.) or fewer cameras (e.g., when one or more images are interpolated and/or extrapolated to generate intermediate views) than the number of images in the set of images. Each image from the set of images can correspond to a camera from the set of cameras. However, two or more images can correspond to the same camera (for example, a camera can be configured to receive two or more different views of a scene such by splitting the optical array, using an optical set-up, etc.) and/or one or more camera can correspond to no images (e.g., to provide redundancy such as another camera stops functioning, becomes obscured, etc.; camera perspective is out of view of the scene; etc.). In a specific example, the camera array can include a single camera. In this example, the single camera can be repositioned (e.g., using a track, stage, actuator, etc.) to acquire the set of images from different perspectives.

Each camera preferably includes a distinct camera computing system. However, one or more cameras can share the same camera computing system.

Each camera of the set of cameras is preferably the same (e.g., same type of camera; same optical sensor such as size, pitch, etc.; same focal length; same lens; etc.), but one or more cameras of the set of cameras can be different (e.g., different type of camera, different optical sensor, different focal length, etc.). Each camera is preferably responsive to visible radiation (e.g., electromagnetic radiation with wavelength between about 400-800 nm), but can be responsive to infrared radiation (e.g., electromagnetic radiation with wavelength between about Boo nm and 100 μm), microwave or radio radiation (e.g., electromagnetic radiation with wavelength longer than 100 μm), ultraviolet radiation (e.g., electromagnetic radiation with wavelength between about 1 nm and 400 nm), x-ray radiation (e.g., electromagnetic radiation with wavelength between about 10 pm and 1 nm), gamma radiation (e.g., electromagnetic radiation with wavelength less than about 10 pm), and/or any suitable radiation. In specific examples, each camera can be a pinhole camera, a plenoptic camera, a single lens reflex (SLR), a digital single lens reflex (DSLR), a point-and-shoot camera, and/or any suitable type of camera. Each camera is preferably automatically operated, but can be manually operated. Each camera can capture images at any suitable framerate between 1 frame per second to 250 frames per second such as about 30 or 60 frames per second. However, each camera can have a frame rate that is greater than 250 fps, less than 1 fps, and/or any suitable frame rate.

Each camera can be associated with a set of camera settings. The camera settings can be dependent on or independent of the camera settings for other cameras. The camera settings for a camera can be the same as and/or different from the camera settings for another camera. Camera settings can include exposure time, shutter speed, gain, frame rate, and/or any suitable camera settings.

Each camera can optionally include an autofocuser which functions to adjust a focus of the camera. However, the camera focus can be static (e.g., set manually, set at a manufacture, etc.), and/or otherwise be set or adjusted.

Each camera is preferably coupled to (e.g., mounted to) a support. However, each camera can have a separate support, and/or each camera can be mounted in any manner.

Figure 4:
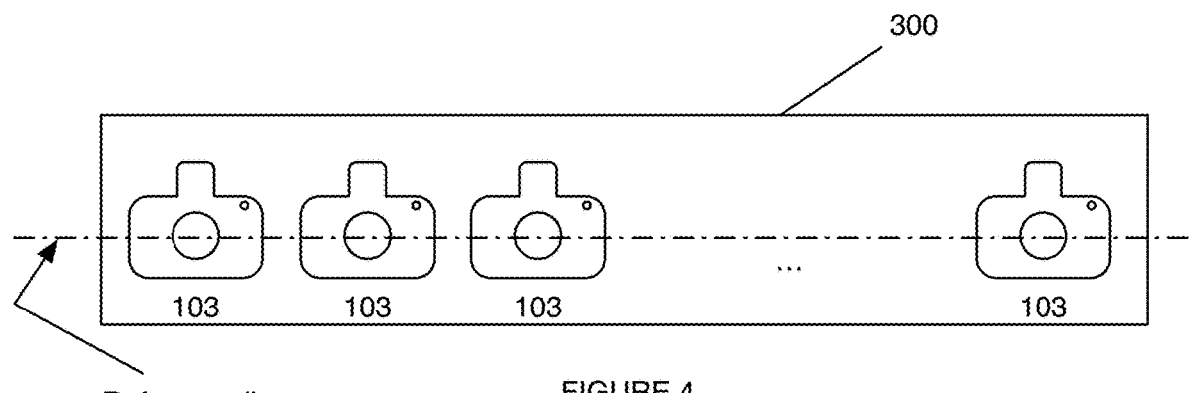
FIG. 4 is a schematic representation of an example of a camera array.

Each camera of the camera array is preferably arranged and/or retained on a reference line (e.g., center of the optical sensor for each camera aligned to the reference line, optical axis of each camera is on the reference line, as shown in FIG. 4, etc.). However, each camera can be arranged randomly, on a two dimensional grid, and/or in any suitable location. The reference line can be straight (e.g., in a linear array or planar array) or curved (e.g., in a curved array). In variants where the reference line is curved, the curvature can be chosen such that each camera is equidistant from a predetermined point (e.g., a focal point), but any suitable curvature can be used. The cameras within the camera array are preferably uniformly spaced (each distance between any two adjacent cameras is the same), but the cameras can be nonuniformly spaced. The spacing between cameras can be any suitable value or range thereof between 0.05 in to 24 in, but can be less than 0.05 in, greater than 24 in, and/or any suitable value. The spacing between cameras can depend on the scene, the focal length of the cameras, the optical sensor of each camera, the number of cameras, the camera field-of-view, and/or can any suitable parameter.

In embodiments of the camera array, one or more camera of the camera array is preferably used as a reference camera (e.g., master camera). Frames captured by the reference camera are preferably used as a reference point for frames captured by the remaining cameras of the camera array. For example, a feature (e.g., object) can be identified in the reference frame. Based on the location of the feature in the reference frame, the feature can be located in frames of the other cameras. In another example, the reference camera can be used as a point of reference from which the relative pose of the other cameras in the camera array can be determined and/or defined. However, the reference camera can be used in any manner.

The reference camera is preferably the camera in the center of the camera array. However, the reference camera can be an extreme most camera (e.g., left most, right most, top most, bottom most, etc.), a virtual camera, and/or any camera of the camera array. The camera that is used as the reference camera is preferably static, but can be variable (e.g., when the feature is outside the field of view of the original reference camera, another camera can be assigned as the reference camera).

The camera array (and/or one or more cameras of the camera array) can optionally include a light source, which function to modify the illumination of the scene. The light source can uniformly (e.g., substantially uniform intensity, substantially uniform illumination wavelengths, etc.) or nonuniformly (e.g., nonuniform intensity, nonuniform illumination wavelengths, etc.) illuminate the scene. The light source preferably emits electromagnetic radiation that corresponds to the electromagnetic radiation that one or more cameras is responsive to, but can correspond to any suitable electromagnetic radiation.

The optional support 300 preferably functions to hold the camera array, but the support can hold any suitable components (e.g., computing system, display, sensors, etc.). The support can rigidly hold the camera array (e.g., allowing translation of one or more camera of the camera array by less than about 10 µm, allowing translation of the camera array by less than about 10 µm, allowing rotation of one or more camera of the camera array by less than about 0.1°, allowing rotation of the camera array by less than 0.1°, etc.), semi-rigidly hold the camera array (e.g., allowing translation of one or more camera of the camera array by less than about 10 mm, allowing translation of the camera array by less than about 10 mm, allowing rotation of one or more camera of the camera array by less than about 5°, allowing rotation of the camera array by less than 5°, etc.), and/or flexibly hold the camera array. The support can be made of metal, plastic, wood, stone, and/or any suitable material.

The support can optionally include a movement subsystem, which functions to position (e.g., translate, rotate) the camera array and/or one or more cameras of the camera array. The movement subsystem can translate (e.g., in x/y/z) and/or rotate about a reference axis (e.g., a global reference axis such as x/y/z of the camera array, a reference axis based on the scene, etc.; a local reference axis such as x/y/z of an optical sensor of a particular camera, an illumination axis of the light source, etc.; etc.). In examples, the movement subsystem can include actuators, motors, gantries, micrometers, robots, guide rails, and/or any suitable movement subsystem.

The computing system preferably functions to process images, transmit images, generate lightfield frames, control the operation of cameras (and/or the camera array), operate the display, and/or any suitable function. Processing images can include: cropping images, aligning images, transforming images, filtering images, compressing images, applying a shader, and/or any suitable image manipulations. The computing system can be local (e.g., to the camera array, to each camera, to the display, to the support) and/or remote (e.g., cloud, central computing system, server, etc.). The computing system is preferably in communication with the camera array, but can be in communication with the display, the movement subsystem, the sensors, and/or with any suitable components.

Figure 3:
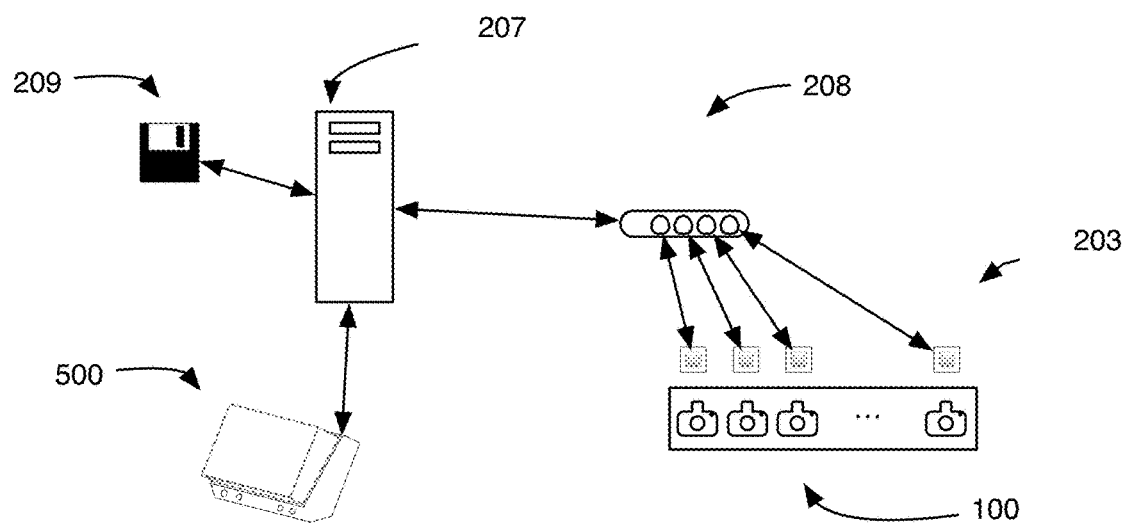
FIG. 3 is schematic representation of an embodiment of the system.

The computing system is preferably distributed, but can be centralized. In a specific example, as shown in FIG. 3, the computing system is distributed across a plurality of camera computing systems 203 (e.g., wherein each camera of the camera array is associated with a distinct camera computing system) and a central computing system 205 (e.g., a display computing system, a server, a cloud computing system, a computing system that is directly coupled to each camera computing system, a remote computing system, etc.). The plurality of camera computing systems can interface with the central computing system via a router 208, communication channels, bus, network, and/or other interface devices or architectures. In this specific example, each camera computing system can function to perform one or more image processing steps (e.g., cropping, transforming, aligning, etc.) on images (or image segments) associated with the camera associated with the respective camera computing system, and/or perform other functionalities. The central computing system can function to send instructions to each camera computing system (and/or the camera array), control the display, identify a feature, generate a lightfield frame (e.g., from the set of images associated with the camera array), and/or perform other functionalities. However, the computing system can be distributed in any suitable manner. In a first variant of this specific example, the central computing system can correspond to the camera computing system for the reference camera. In a second variant of this specific example, the reference camera can include a camera computing system that is distinct from the central computing system.

The computing system can include one or more: processing module, communication module, lightfield module, control module, storage module, and/or any suitable module.

The processing module functions to process images and/or image segments. The processing module can apply transformations (e.g., translation, scaling, homothety, similarity transformation, reflection, rotation, and shear mapping), crop images, compress images, and/or process the images in any suitable manner. The processing module can include one or more: GPUs, CPUs, TPUs, microprocessors 201, and/or any other suitable processor. The processing module is preferably included in each camera computing system, but can be included in the central computing system, distributed across computing systems, and/or be included in any suitable computing system. The processing module preferably processes images frame-by-frame (e.g., as frames are received), but can process frames in batches (e.g., process a set of images at substantially the same time).

The communication module functions to receive and transmit data (e.g., images, instructions, etc.) and/or metadata. The communication module can enable long-range and/or short range communication. In specific examples, the communication module can include cellular radios (e.g., broadband cellular network radios) such as radios operable to communicate using 3G, 4G, and/or 5G technology, Wi-Fi radios, Bluetooth (e.g., BLE) radios, Zigbee radios, Z-wave radios, Thread radios, wired communication modules (e.g., wired interfaces such as coaxial cables, USB interfaces, fiber optic, waveguides, etc.), and/or any other suitable communication subsystems. The communication module can be included in each camera computing system, the central computing system, and/or any suitable computing system.

The lightfield module functions to generate a lightfield frame from a set of images (e.g., acquired images, processed images). The lightfield frame preferably includes every image from the set of images, but can include a subset of images from the set of images, and/or any suitable images. The lightfield frame is preferably formatted to be displayed as a holographic representation of the scene by the display, but can be formatted in any suitable manner. The lightfield frame can be formatted as a quilt image, a photoset, and/or in any suitable format. The lightfield module is preferably included with the central computing system, but can be included with one or more camera computing systems and/or any suitable computing system.

The control module functions to generate and provide instructions (e.g., commands) from the computing system to the camera array, to the movement subsystem, to the display, and/or to any suitable component. In specific examples, the instructions can include: start streaming, acquire images, calibrate camera(s), display lightfield frame, display image (e.g., specific image numbers), stop displaying lightfield frames, stop displaying images, restart, shut down, stop streaming, stop recording, start recording, transfer data, transfer images, process images (e.g., transform, crop, compress, etc.), translate camera, rotate camera, translate camera array, rotate camera array, and/or any suitable instructions. The control module can be included in the central computing system, one or more camera computing system, and/or any suitable computing system.

The storage module 209 (e.g., memory, database) functions to store images, lightfield frames, and/or data (e.g., calibration data, camera pose, etc.). The storage module can store: acquired image(s), processed image(s), lightfield frames, video, lightfield video, camera poses, camera calibrations (e.g., extrinsic calibration, intrinsic calibration, etc.), and/or any suitable data. The storage module can include volatile or nonvolatile memory. The storage module can be included in the central computing system, one or more camera computing systems, and/or any suitable computing system.

The system can optionally include one or more displays 500. The display can function to display the lightfield frame (and/or any suitable image(s) from the set of images). The display is preferably coupled to (e.g., in communication with) the central computing system, but can be in communication with one or more camera computing system, and/or any suitable component. The display can be associated with the user (e.g., the individual operating the camera array, the owner of the camera array, etc.) and/or with a different user. The display is preferably a lightfield display (e.g., a display configured to display lightfield frames as a hologram). However, the display can be a 2D display (e.g., CRT, LCD, OLED, plasma display, etc.) and/or any suitable display can be used. The display can be a black and white or a color display. In specific examples, the display can include any suitable display as disclosed in U.S. Pat. No. 10,191,295 entitled 'ADVANCED RETROREFLECTING AERIAL DISPLAYS', filed on 5 Jan. 2018 or U.S. patent application Ser. No. 16/374,955 entitled 'SUPERSTEREOSCOPIC DISPLAY WITH ENHANCED OFF-ANGLE SEPARATION,' filed on 4 Apr. 2019, each of which is incorporated herein in its entirety by this reference. However, any display can be used.

Figure 11:
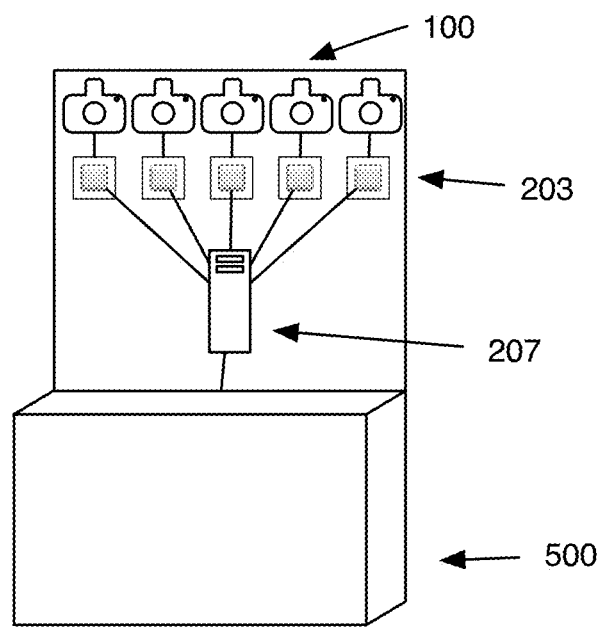
FIG. 11 is a schematic representation of an example of an integrated lightfield capture and lightfield display system.

In some variants, as shown for example in FIG. 11, the display can be integrated into the support to generate a single system that can capture and display lightfield frames. In a specific example of these variants, the system can be a handheld and/or portable device such as having a weight less than about 10 lbs (e.g., 0.1 lbs, 0.25 lbs, 0.5 lbs, 1 lbs, 2 lbs, 5 lbs, etc.), a dimension (e.g., length, width, depth) less than about 25 inches (e.g., 1 mm, 5 mm, 10 mm, 20 mm, 50 mm, 100 mm, 200 mm, 250 mm, 500 mm, etc.), and/or be otherwise configured for portability. However, the display can be separate from the camera array and/or otherwise arranged.

In variants including a plurality of displays, each display can be the same as or different from the other displays.

The optional sensors 400 function to determine one or more characteristics of a scene. The sensors can additionally or alternatively function to determine characteristics of and/or changes in the system. Examples of characteristics of the scene can include separation distance between one or more feature in the scene and one or more camera of the camera array, sound generated from one or more features, motion of one or more feature, location of one or more feature, illumination (e.g., how bright is a scene, how is the scene lighted, etc.), and/or any suitable characteristics. Examples of characteristics of the system can include: camera pose (e.g., location, orientation, etc. for camera array and/or each camera in the array), obscuration of one or more cameras, computer speed (e.g., communication speed), memory limits, changes in connection, type of display, number of displays, and/or any suitable system characteristics. Examples of sensors can include: spatial sensors (e.g., ultrasound, optical, radar, etc.), acoustic sensors (e.g., microphones, speakers, etc.), light sensors (e.g., photodiodes), tracking sensors (e.g., head trackers, eye trackers, face trackers, etc.), and/or any suitable sensor.

In some variants, one or more cameras from the camera array can be used as sensors. In a specific example, two cameras from the camera array can be used to collect stereoscopic images of a scene, wherein the stereoscopic images can be used to determine a depth map for the scene. However, the camera(s) can be used as sensors in any suitable manner.

The system can optionally include a calibration object, which functions to facilitate the determination of intrinsic and/or extrinsic parameters of each camera of the camera array. The calibration object can additionally or alternatively be used to determine color calibrations, intensity calibrations, display calibrations, and/or any suitable calibrations for the system. Intrinsic parameters for each camera can include focal length, image sensor format, principle point, skew, lens distortion (e.g., radial lens distortion, tangential lens distortion), and/or any suitable parameters. Extrinsic parameters can include absolute camera position (e.g., x/y/z camera position in space), camera orientation (e.g., with respect to rotation about an x/y/z axis, pitch, yaw, roll, etc.), relative camera position (e.g., relative to another camera within the camera array, relative to a reference point, etc.), relative camera orientation (e.g., relative to another camera, relative to a reference orientation, etc.), scaling, camera pose, and/or any suitable parameters.

During use, the calibration object is preferably arranged at a center point of the camera array such as along the optical axis of a central camera of the camera array. However, the calibration object can be placed at any suitable location within the field of view of every camera of the camera array, within the field-of-view of a subset of cameras of the camera array, along the optical axis of any suitable camera, and/or at any suitable location. During use, the calibration object can placed with a known orientation relative to the camera array, can be moved within the field of view of the camera array, and/or otherwise be positioned. For example, a reference axis of the calibration object (e.g., an axis between two points of the calibration object, a characteristic of a feature of the calibration object, an edge of the calibration object, an edge of a feature of the calibration object, etc.) can be aligned to a reference axis of the camera array. However, the calibration object can be arranged with an unknown orientation relative to the camera array and/or have any orientation relative to the camera array.

In a series of examples, the calibration object can include: a single point standard (e.g., a single illumination source, a pattern that includes a single feature, etc.), a two-point standard (e.g., two illumination sources having different colors, different intensities, different positions, etc.; a pattern that includes two features; etc.), three point standard (e.g., three illumination sources having different colors, different intensities, different positions, etc.; a pattern that include three features; etc.), multi-point standard (e.g., having four or more features, four or more illumination sources, etc.), a checkerboard pattern, a stripe pattern, ArUco markers, a circle pattern, a charuco pattern, asymmetric pattern (e.g., asymmetric circle pattern; pattern with uneven distribution of bolding, color, highlighting, etc.; etc., and/or a planar pattern. However, any suitable calibration object can be used.

4. Method.

As shown for example in FIG. 2, the method 20 can include acquiring images S220 and processing the images S230. The method can optionally include calibrating the camera array S210, transmitting the images S240, generating a lightfield frame S250, displaying the images S260, and/or any suitable steps. Each camera of a camera array preferably performs Steps S220-S240 in parallel (e.g., concurrently), however, S220-S240 can additionally or alternatively be performed in series (e.g., sequentially, for one camera at a time), a subset of cameras of the camera array can perform steps S220-S240 in parallel, and/or the steps can be performed with any timing (e.g., between cameras). The method and/or steps thereof can be performed continuously, until a predetermined number of lightfield frames is generated, until a bandwidth exceeds a threshold bandwidth, once (e.g., to generate a lightfield image), until an end command, until a memory module is full, for a predetermined length of time, and/or until any suitable condition is met. The method is preferably performed in real- or near-real time (e.g., with image capture), but can alternatively be performed asynchronously. In an illustrative example of real- or near-real time performance, a lightfield image can be generated (e.g., in step S250) before new images are acquired (e.g., in S220) when the method is performed continuously. In a second illustrative example, a lightfield image can be generated at approximately the same frame rate as the cameras acquire images. However, real- or near-real time performance can be otherwise defined.

Calibrating the camera array S210 functions to calibrate the camera array and/or each camera of the camera array. The calibration can include intrinsic parameters, extrinsic parameters, color calibrations, intensity calibrations, and/or any suitable parameters for each camera of the camera array. S210 can be performed once (e.g., when the camera array is manufactured, when the camera array is set-up, per instance of the method, etc.) or more than once. S210 can be performed automatically or manually. S210 is preferably performed cooperatively by the central computing system, each camera computing system, and camera array using a calibration object. However, S210 can be performed by the central computing system, camera computing system, camera array, and/or any suitable component.

S210 preferably outputs transformation matrices (e.g., roll, pitch, yaw, lateral, and/or vertical transformation, focus transformation, zoom transformation, etc.) for a given camera, to transform the camera frame to the reference frame, but can alternatively output other information. Additionally or alternatively, S210 can output crop transformation matrices to transform a cropped segment from the reference frame to the camera frame (e.g., wherein the crop transformation matrices can be the inverse of the image transformation matrices).

The calibration can be a relative calibration (e.g., relative to a reference, such as a reference camera of the camera array, a calibration object, an object within the scene, relative camera pose, a reference object on the support, etc.) and/or an absolute calibration (e.g., absolute pose). The camera selected as the reference camera can vary (e.g., a different camera is selected as the reference camera in response to an object in a scene moving) or be fixed. The reference camera can be the first camera (e.g., based on camera number, based on camera position, etc.), the last camera (e.g., based on camera number, based on camera position, etc.), a central camera, a camera wherein a feature of interest is centered on the optical sensor of the camera, a random camera, and/or any suitable camera.

S210 can include acquiring one or more images of the calibration object. When a plurality of images of the calibration object are acquired, each image can be acquired with the calibration object in a different configuration (e.g., different illumination, different orientation, different position, different distance between the camera array and the calibration object, etc.), and/or in the same configuration. In an illustrative example, when the calibration object includes two illumination sources, S210 can include acquiring (e.g., with each camera) a first image of the calibration object with one illumination source activated and a second image of the calibration object with the second illumination source activated. When a plurality of images of the calibration object are acquired, each image can be acquired with the calibration object at different locations (e.g., translated in a direction perpendicular to the optical axis of a camera of the camera array, translated in a direction parallel to the optical axis of a camera of the camera array, etc.) and/or at the same location.

Figure 7:
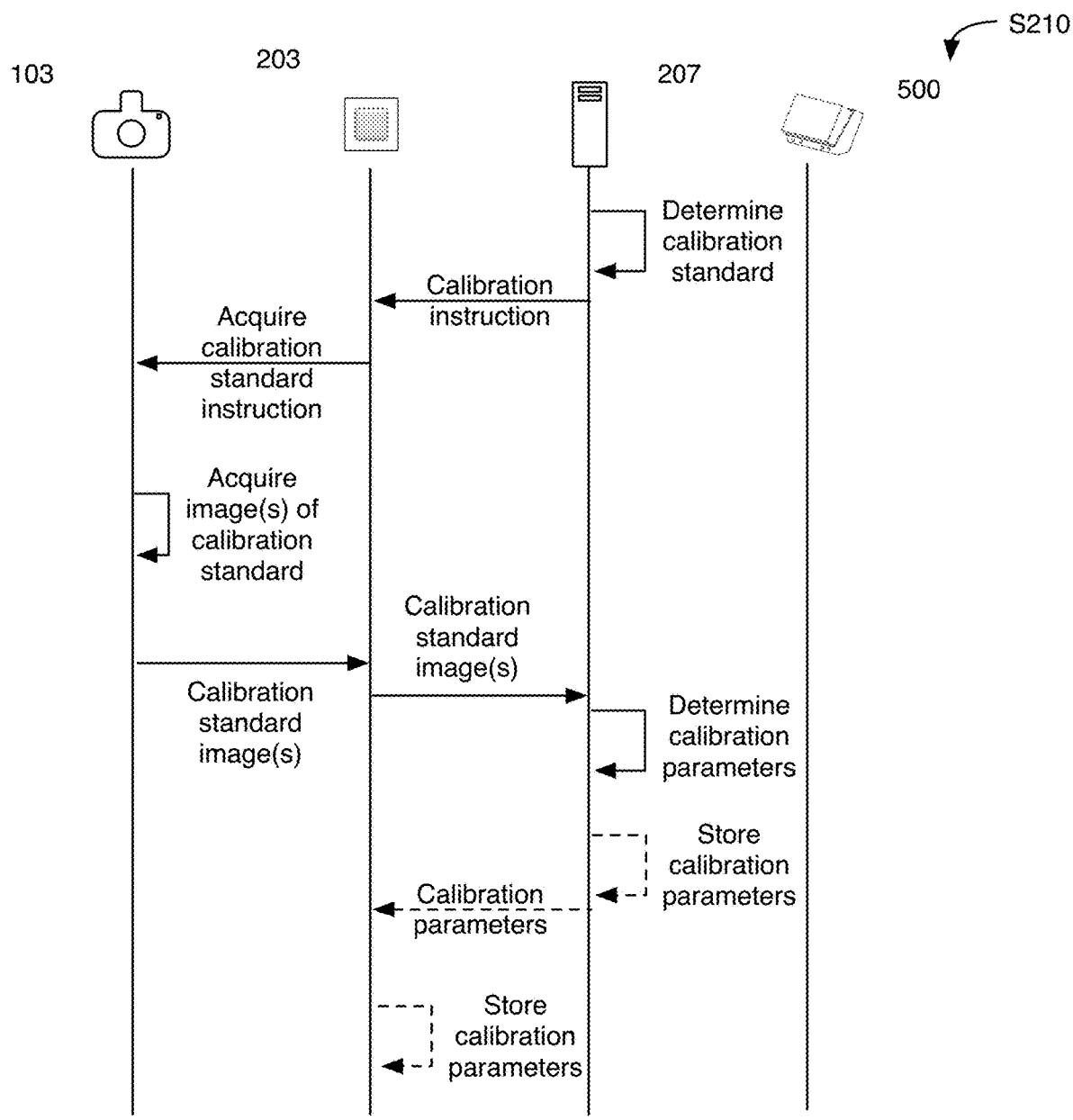
FIG. 7 is a schematic representation of an example of calibrating a camera of the camera array.

In a specific example, as shown in FIG. 7, calibrating the camera array can include, for each camera: determining the type of calibration object; transmitting a calibration instruction from the central computing system to the camera computing system: transmitting an acquire calibration object image instruction from the camera computing system to the camera; based on the type of calibration object, acquiring one or more images of the calibration object; transmitting the calibration object images from the camera to the camera computing system, transmitting the calibration object images from the camera computing system to the central computing system; determining the calibration parameters; and storing the calibration parameters (e.g., at the central computing system, at the camera computing system, etc.). Determining the calibration parameters can include determining features (e.g., using computer vision, manually, etc.) of the calibration object and determining the calibration parameters based on a relationship (e.g., distance between, orientation, etc.) between the features. However, calibrating the camera array can include any suitable steps.

Figure 9:
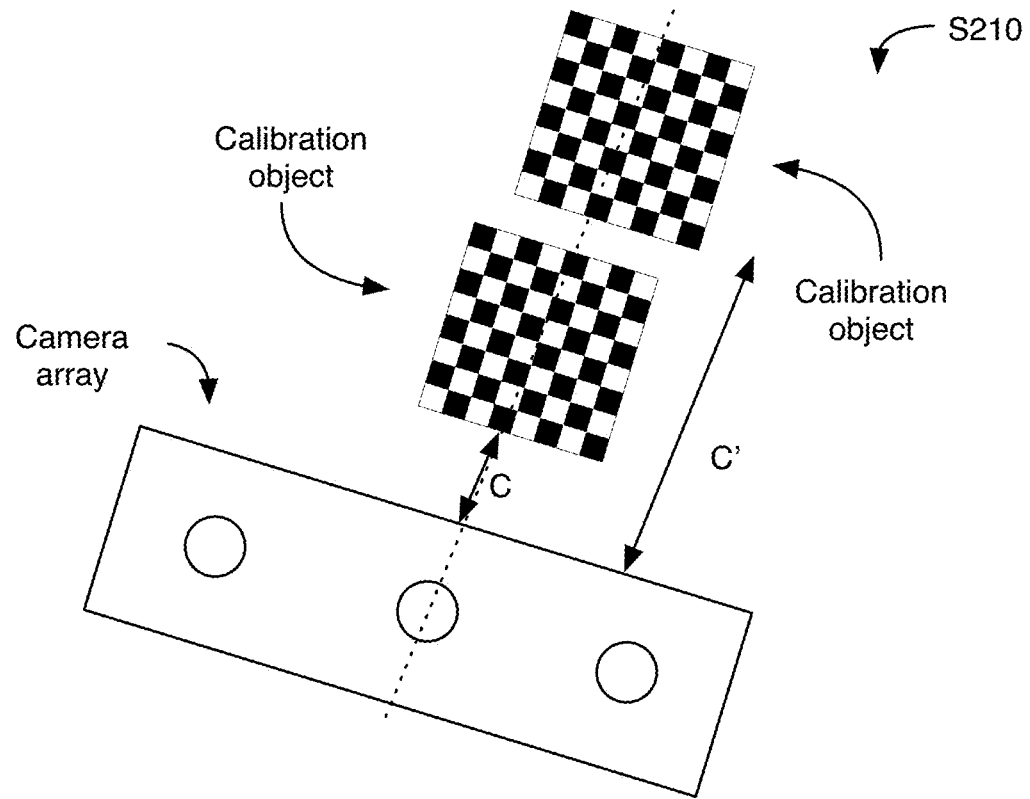
FIG. 9 is a schematic representation of an example of calibrating a camera array using a calibration object.
Figure 10:
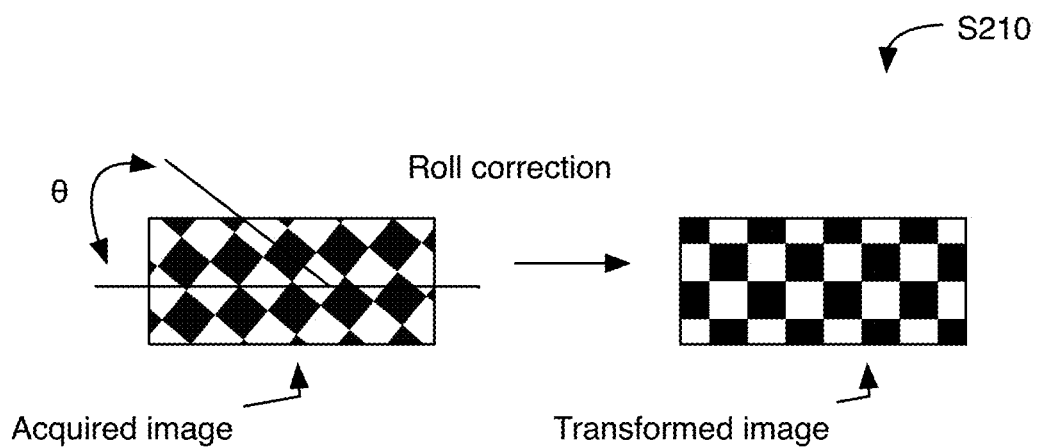
FIG. 10 is a schematic representation of an example of transforming an image.

In an illustrative example (e.g., when the camera has an ideal linearized lens, when the intrinsic parameters are known and the calibration object image has been linearized, etc.), S210 can include determining a roll correction for each camera. Each roll correction can be used to rotate images associated with the respective camera to a common alignment (e.g., an alignment with zero effective roll, rectified images, etc.) with images associated with other cameras of the camera array. As shown in FIGS. 9 and 10, in this illustrative example, the roll correction for each camera can be determined by: acquiring an image of the calibration object at a first distance from the camera (array) (C), acquiring a second image of the calibration object at a second distance from the camera (array) (C'), determining a first feature orientation of a calibration feature within the first image and second feature orientation of the calibration feature within second image, and determining the roll correction based on the first and second feature orientations. In this illustrative example, determining the roll correction can include determining an angle between the first and second feature orientations and a reference axis (e.g., a lateral axis of the image, a longitudinal axis of the image, a reference feature of the calibration image, an edge of the image, etc.). This angle can correspond to the roll correction. However, the pose (e.g., pitch, yaw, roll, x/y/z) for each camera (e.g., absolute orientation, relative orientation such as relative to a reference camera of the camera array, etc.) can be determined from the first and/or second images of the calibration object using a direct linear transformation method, Zhang's method, Tsai's method, and/or using any suitable calibration method.

However, S210 can determine any suitable corrections and/or calibrations for each camera and/or the camera array.

In some variants, S210 can include repositioning one or more cameras to partially or fully correct the camera alignment. For example, a camera can be rotated so that it has no roll. However, one or more cameras can be repositioned in any suitable manner.

Acquiring the set of images S220 functions to acquire the set of frames of a scene (e.g., frames that are used to generate the lightfield frame of the scene). S220 is preferably performed after S210, but S220 can be performed before and/or at the same time as S210. S220 is preferably performed by a camera array, but can be performed by a computing system (e.g., wherein images are retrieved from a memory module, wherein one or more images are simulated, etc.) and/or by any suitable component. Each frame of the set of frames is preferably associated with a camera of the camera array. However, each frame can be associated with a camera position (e.g., wherein a camera is moved to one or more positions), and/or associated with any suitable camera information. S220 is preferably performed automatically (e.g., in response to receiving an instruction at a camera, the camera acquires a frame), but can be performed manually.

Each image is preferably acquired at substantially the same time across different cameras of the same array (e.g., synchronously; concurrently; contemporaneously; simultaneously; within 1 ms, 10 ms, 20 ms, 30 ms, 50 ms, 100 ms, etc. of each other; etc.). However, each image can be acquired independently of other frames (e.g., frames associated with a first camera can be acquired independently of frames acquired with a second camera), acquired with predetermined timing (e.g., relative to other camera frames), and/or with any suitable timing.

The camera settings for each camera are preferably selected such that image parameters (e.g., brightness, contrast, etc.) associated with a frame from one camera are substantially equal to (e.g., differ by <1%, <5%, 10%, etc.) image parameters associated with a frame from another camera. Camera settings can include: zoom, focus, exposure, color balance, and/or other settings. However, the camera settings can be selected based on S210, based on a camera position, based on a scene, and/or in any manner. The camera settings can be determined by: the central computing system (e.g., based on the camera's relationship to the reference camera, based on the viewer's settings, automatically, etc.), the camera itself (e.g., using autofocus), and/or otherwise determined.

In some variants, S220 can include acquiring frames corresponding to a subset of pixels of each camera. The subset of pixels are preferably selected based on the location of the feature within the respective camera's field-of-view (for example, the subset of pixels can correspond to a crop region as determined in S230 such that the camera only reads out or collects visual data within the subset of pixels), but can be otherwise selected.

S220 can optionally include adjusting a focus of one or more cameras of the camera array. The focus can be adjusted manually (e.g., by a user) and/or automatically (e.g., using an autofocuser). The focus is preferably adjusted based on a distance between the camera and the feature in the scene. The distance can be determined using a depth sensor, a depth map (e.g., generated using images from two cameras of the camera array), a tracking sensor, and/or otherwise be determined. However, the focus can additionally or alternatively be adjusted to a pixel region (e.g., the frame subset as determined in S230), and/or otherwise be adjusted.

S220 can optionally include recording an audio signal associated with the scene. The audio signal is preferably, but does not have to be, associated with a time stamp (e.g., to enable synchronizing the audio signal with the set of images).

Processing the images S230 preferably functions to reduce the image size (e.g., the amount of data that each image contains), align the images, rectify the images, compress the images, and generate a set of processed images (e.g., transformed images, cropped images, focal shifted images, compressed images, etc.) from the set of images (e.g., acquired in S220). Each frame (e.g., from the set of images) is preferably processed by the camera computing system associated with the camera that acquired said frame. However, S230 can be performed by any computing system (e.g., a central computing system, a camera computing system associated with a different camera, etc.) and/or by any suitable component. S230 is preferably performed after S220, but can be performed at the same time as S220. S230 is preferably performed immediately after S220 (e.g., less than 1 ms, 5 ms, 10 ms, 100 ms, 1 s, 5 s, 10 s, 30 s, etc. after), but can be performed at any time after S220. S230 is preferably performed automatically, but can be performed semiautomatically and/or manually. S230 preferably processes each image of the set of images (e.g., acquired in S220), but one or more images can remain unprocessed. Each image is preferably processed based on the camera (e.g., camera pose, pixel pitch, etc.) associated with the respective image. However, one or more images can be processed based on a physical model (e.g., of the camera), based on optical models, and/or based on any suitable input(s).

S230 can include determining one or more features, transforming an image, selecting a frame subset, compressing an image, adjusting a focus of the image, and/or any suitable step.

Determining one or more features function to identify one or more features of interest in an image. Determining one or more features can be performed automatically (e.g., using artificial intelligence, edge detection, corner detection, blob detection, autocorrelation, shape detection, principal component analysis, semantic segmentation, etc.) or manually (e.g., by a user, a viewer, etc.). Determining one or more features is preferably performed before transforming an image, but can be performed during and/or other transforming an image. In variants configured to capture video (e.g., lightfield video), the features can be stored, tracked across frames, determined for each frame, and/or handled in any manner. The feature(s) of interest can be determined by each camera computing system (e.g., within the frames captured by the respective camera), by a camera computing system associated with a reference camera of the camera array, manually, by the central computing system (e.g., by analyzing the reference camera's image(s), by analyzing all cameras' images, etc.), by the viewing system (e.g., wherein the viewer selects the feature of interest on the viewing system, wherein the feature is selected based on the viewer's attention to said feature as determined from the viewing system, etc.), and/or in any suitable manner. In an illustrative example, the feature(s) are detected in the reference image. However, the features can be detected in any suitable image(s). Determining one or more features can include classifying one or more features (e.g., to identify a feature class) and selecting one or more features (e.g., to choose a subset of features to be tracked and/or used for processing the image).

The feature is preferably determined in a frame associated with the reference camera, where the reference camera can transmit the pixel coordinates of the feature to the remaining cameras of the camera array (e.g., via the central computing system). However, the feature can be determined independently at two or more cameras and/or be determined from any suitable frames.

The one or more features are preferably tracked between frames, which can function to decrease the amount of computation required to determine the pixel coordinates of a feature location within subsequent frames. The features are preferably tracked using a tracking sensor (e.g., coupled to the support, coupled to a camera of the camera array, etc.). However, the features can be tracked within frames (e.g., of one or more cameras) and/or otherwise be tracked. Tracking the feature can include determining a distance between the feature and camera(s) and/or any suitable steps.

Transforming an image preferably functions to modify a frame (e.g., acquired image, processed image) based on the camera calibration (e.g., the camera pose) for the camera associated with the respective frame. However, additionally or alternatively, transforming a frame can modify a subset of the frame (e.g., a subset of a frame associated with a feature). The image can be transformed based on camera pose, a feature (e.g., feature location, feature orientation, etc.), based on a calibration matrix, and/or in any manner. In a preferred embodiment, transforming an image includes applying an affine transform (e.g., any combination of one or more: translation, scaling, homothety, similarity transformation, reflection, rotation, and shear mapping), which can function to dewarp the image. However, transforming the image can include applying a projective transformation, similarity transformation, Euclidean transformation, and/or any suitable transformation(s). In an illustrative example, only auxiliary images (e.g., images associated with cameras of the camera array except for the reference camera) can be transformed. In a second illustrative example, all images can be transformed (e.g., according to calibration matrix, camera pose, etc.). In a third illustrative example, image segments (e.g., crop regions) associated with one or more camera (e.g., auxiliary images, reference images, etc.) can be transformed. However, any suitable images can be transformed.

In a first specific example, transforming a frame can include applying a roll correction S232 (e.g., as measured in S210, stored roll correction for the camera, etc.) based on the camera associated with the frame. Applying the roll correction can correct for a roll rotation of the camera (and/or image).

In a second specific example, transforming the image can include projecting a frame to correct for the pitch and/or yaw rotation S235 of the camera associated with the frame. The pitch and/or yaw rotation can be relative to a camera of the camera array (e.g., a reference camera), relative to a global reference point (e.g., an object in the scene, the support, a predetermined reference point), and/or any suitable reference point. However, the pitch and/or yaw rotations can be absolute values. The pitch and/or yaw rotation can be determined in S210, be modeled, be accessed from a memory module, and/or can be determined in any suitable manner. However, camera pitch and/or yaw rotation can be corrected based on the crop box position and/or otherwise corrected.

In a third specific example, transforming the image can include translating and/or scaling an image S238 to correct for translation of the camera associated with the image. The translation can be a relative translation relative to a camera of the camera array (e.g., a reference camera), relative to a global reference point (e.g., an object in the scene), and/or any suitable reference point. However, the translation can be an absolute translation and/or position. The translation can be determined in S210, be modeled, and/or can be determined in any suitable manner. However, camera translation can be corrected based on the crop box position and/or otherwise corrected.

Figure 12:
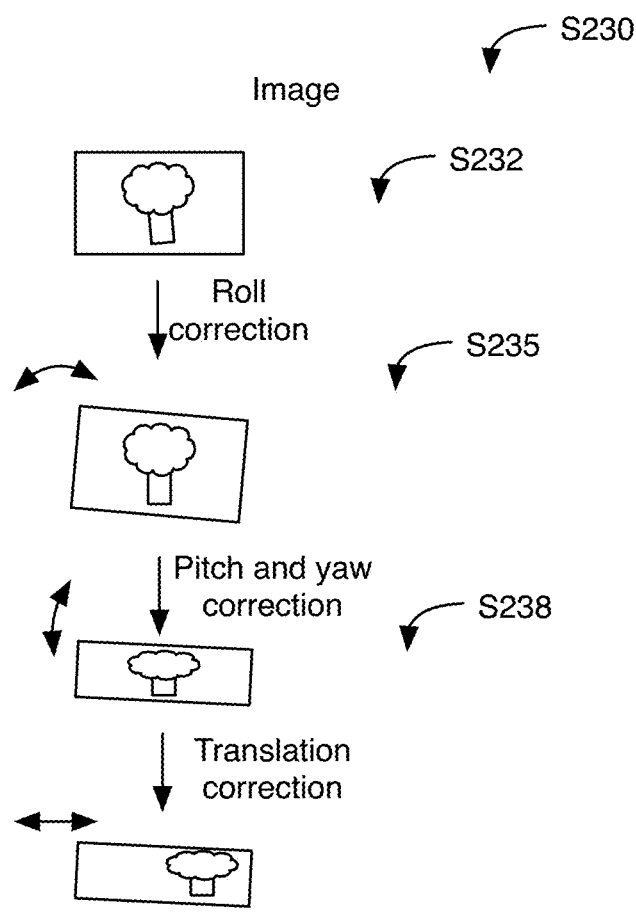
FIG. 12 is schematic representation of an example of transforming an image to correct for roll, pitch and yaw, and translation.

In a fourth specific example, transforming the image can include applying a roll correction, a pitch and/or yaw correction, and/or a translation correction. The roll correction, pitch and/or yaw correction, and translation correction can be applied in any order. In a variant as shown for example in FIG. 12, a roll correction can be applied before a pitch and/or yaw correction which can be applied before a translation correction. However, the roll correction can be applied after the pitch and/or yaw correction and/or after the translation correction; the pitch and/or yaw correction can be applied after the translation correction; the corrections can be applied simultaneously (e.g., using a single transformation such as a transformation matrix that accounts for roll, pitch, yaw, and/or translation corrections), and/or be applied in any order.

However, transforming the image can include any suitable steps.

Selecting a frame subset functions to reduce the size of the image (e.g., to a predetermined size such as number of pixels, amount of memory required to store the image, amount of bandwidth required to transmit the image, etc.) and remove one or more pixels from the image (e.g., pixels to be excluded from the lightfield frame). In a preferred embodiment, selecting a frame subset includes cropping the frame to match the frame subset. However, additionally or alternatively, only the frame subset can be transmitted, the frame subset can be further processed (e.g., different transformations can be applied to pixels of the frame subset and pixels outside of the frame subset), and/or the frame subset can be otherwise used.

The frame subset (e.g., crop region) can be determined manually (e.g., selected by a user) and/or automatically (e.g., based on computer vision, based on the scene, based on the feature(s) of interest, based on a reference camera, based on a tracked feature, etc.). The frame subset can be constant or variable (e.g., across concurrently acquired images, across frames associated with a single camera, across cameras, etc.). The frame subset (and/or properties thereof) can depend on the distance between a feature (e.g., of the scene) and the camera array (e.g., average distance, maximum distance, minimum distance, distance to a reference camera of the camera array, etc.), depend on a feature size (e.g., number of pixels that the pixel occupies, physical size of the feature, etc.), depend on the number of features, depend on the camera (e.g., camera resolution), depend on the display (e.g., display resolution), and/or can depend on any suitable parameter. The shape of the frame subset can be a square, rectangle, circle, ellipse, match a shape of the display, be a polygon, a feature shape (e.g., match the boundary of the feature, match the boundary of the feature and a buffer space, etc.), and/or have any suitable shape. The frame subset preferably fully encompasses the feature(s). However, the frame subset can encompass a portion of the feature(s), a region adjacent to the features, and/or otherwise encompass a portion of the frame. The frame subset size (e.g., the total number of pixels in the frame subset, the number of pixels in length, the number of pixels in width, etc.) preferably depends on the feature size (e.g., the extent of the frame that the feature occupies), but can additionally or alternatively be a fixed size, be variable, depend on a lightfield frame resolution, depend on a lightfield frame size, depend on a computing system bandwidth, depend on a lightfield image data size (e.g., the frame subset can be selected so that the lightfield image has a target or threshold resolution), and/or can be otherwise determined.

The properties of the frame subset for each image of the set of images are preferably the same. However, one or more frames of the set of images can have a different frame subset property (e.g., different size, different shape, different orientation, etc.).

The frame subset can include or be part of: a set of pixel coordinates (e.g., the top left corner of a predetermined crop segment), the boundaries of a crop segment (e.g., a bounding box, the feature or object perimeter, etc.), a position or pose in 3D space, and/or include any other suitable positional reference within the camera frame and/or within the scene.

Figure 6:
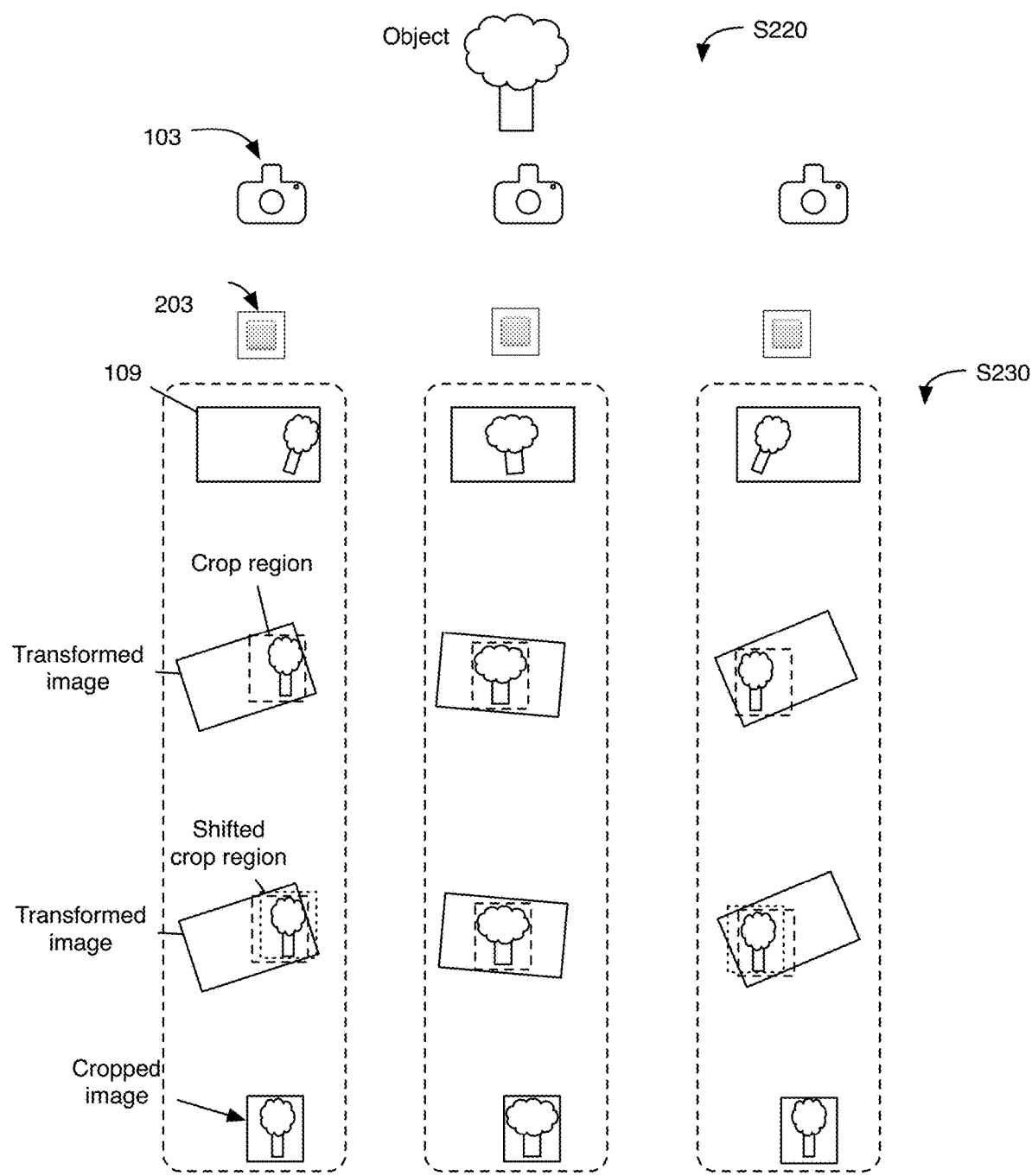
FIG. 6 is a schematic representation of an example of acquiring and processing images.

The frame subset preferably includes one or more features (e.g., a feature of interest) of the image. For example, as shown in FIG. 6, the center of the frame subset (e.g., horizontal center, vertical center) is preferably centered over a feature of the scene (e.g., shifted image). The frame subset preferably includes the same feature in each image of the set of images (e.g., processed images, acquired images). However, the frame subset can include different features in different images of the set of images and/or different portions of the scene. The feature is preferably aligned to substantially the same location (e.g., the center of mass of the feature aligned to the same pixel column, same pixel row, within 5 pixel columns, within 5 pixel rows, within 10 pixel columns, within 10 pixel rows, etc. between images) within the frame subset for each image. However, the feature(s) can be unaligned relative to other images and/or can be aligned in any way between images. However, the frame subset can be positioned based on the calibration (e.g., from S210) and/or in any suitable location.

When the frame subset extends outside of the image bounds, the frame subset can include black pixels to fill the frame subset, white pixels to fill the frame subset, null values, simulated pixels (e.g., model or simulate what the missing pixels would look like), and/or can fill in the frame subset in any suitable manner.

In a first variation, the frame subset is determined based on the detected features within an image. The image is preferably the reference image, wherein the frame subset is a reference frame subset, but can alternatively be any image. Determining the frame subset can include: determining a bounding box around the feature of interest, determining the boundaries of the feature (e.g., using semantic segmentation, foreground/background segmentation, instance segmentation, etc.), and/or otherwise determining the frame subset.

In a second variation, the frame subset (crop region) is determined based on the reference frame subset. This is preferably performed for each non-reference image (e.g., captured by non-reference cameras), but can alternatively be performed on reference images. In particular, this can include transforming the reference frame subset into the target camera frame, which can function to determine the segment of the respective camera's image to crop or send to the central computing system. Variants of the method using frame subset transformation can exclude image transformation, or include all or portions of the image transformation discussed above. The frame subsets can be transformed (e.g., rotated, translated, or otherwise manipulated) using: the same methods as image transformation as discussed above, a combination of said methods, and/or different methods. The frame subset that is preferably transformed using transformations relating the target camera with the reference camera, but can alternatively be transformations relating the target camera with a standard frame subset, transformations relating the target camera with a standard reference point (e.g., 3D point), transformations relating the target frame subset with the reference frame subset, or be any other suitable frame subset.

In a specific example, the crop region location for each image of a set of images can be calculated according to:

CropRegionLocation=ReferenceCameraCropRegionLocation+ RotationPixelShift+TranslationPixelShift, where the SubsetRegionLocation is a position (e.g., x,y coordinates, pixel number, etc. corresponding to a lowermost, uppermost, rightmost, left most, center of mass, etc. region of the frame subset) for the frame subset for a camera of the camera array, the ReferenceCameraSubsetRegionLocation is a position (e.g., x/y coordinates, pixel number, etc.) for the crop box for the reference camera of the camera array. The MasterCameraCropRegionLocation can be determined manually (e.g., by a user positioning the crop box) and/or automatically (e.g., based on feature(s) of interest in the scene such as to include the feature(s) of interest, include the features of interest plus a predetermine buffer around the feature(s) of interest, etc.; based on the reference camera calibration; based on tracking of the feature, etc.). In this specific example, RotationPixelShift can be determined according to:

RotationPixelShift=axisRotation*focalDistance*RotationConstant* GeometryConstant Where axisRotation corresponds to the axis along which the crop box is rotated (e.g., x/y/z, Euler axis, moment of the crop box, etc.), focalDistance corresponds to a distance between the camera and the feature of the scene, RotationConstant corresponds to a relative angle to rotate about the axis (e.g., a pitch and/or yaw rotation angle such as determined from S210, based on the orientation relative to the reference camera, etc.), and where the optional GeometryConstant accounts for the geometry of the camera relative to the camera array. In this specific example, TranslationPixelShift can be determined according to TranslationPixelShift=axisTranslation*TranslationConstant/ focalDistance*GeometryConstant, where axisTranslation corresponds to the axis along which the crop box is translated (e.g., x/y/z, Euler axis, moment of the crop box, etc.), TranslationConstant corresponds to a relative distance to translate the crop box (e.g., x/y translation, lateral translation, longitudinal translation, etc. such as determined in S210, a translation relative to the reference camera, etc.).

Figure 13:
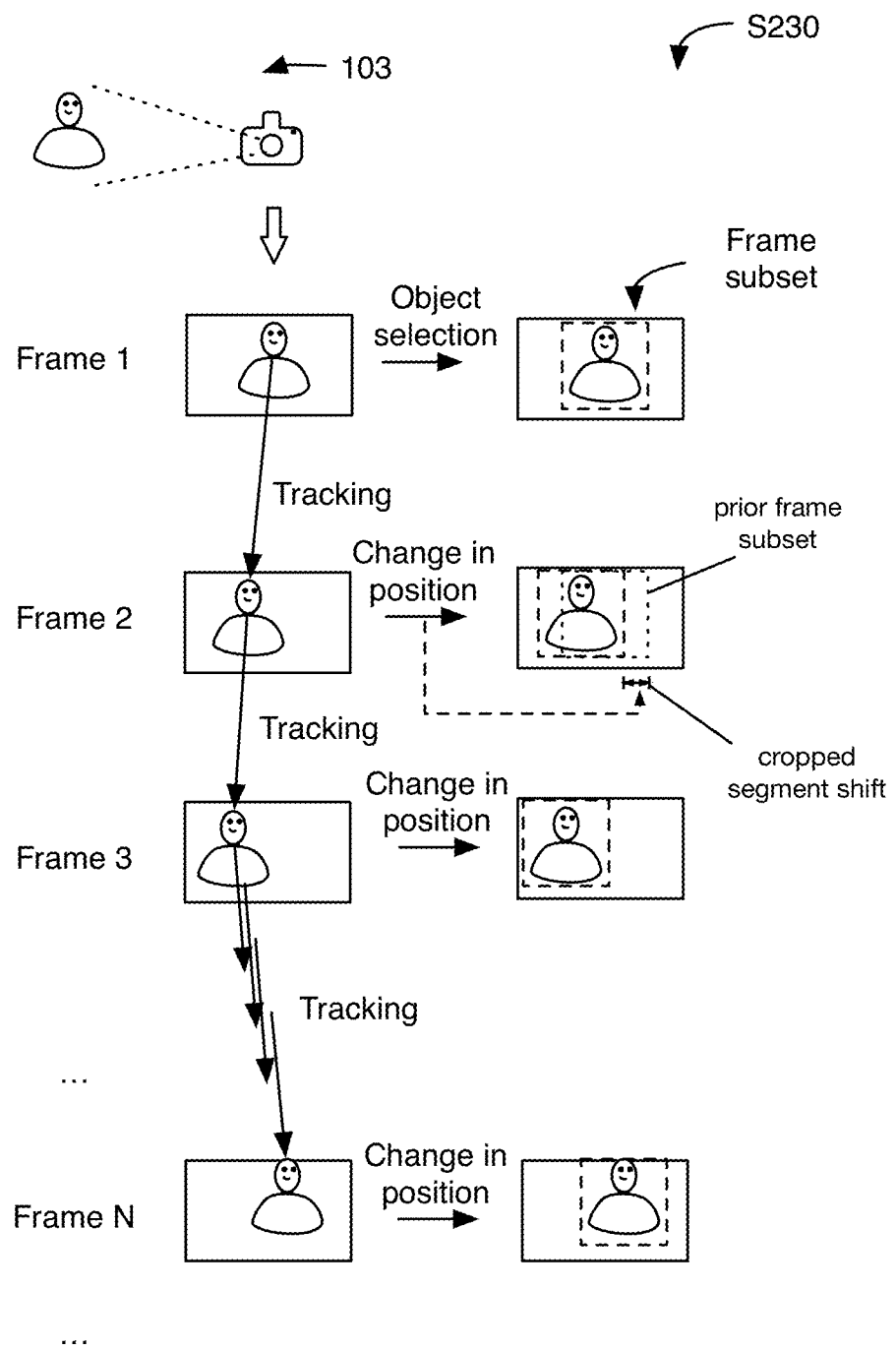
FIG. 13 is a schematic representation of an example of determining a frame segment by tracking a change in an object's position between frames and selecting the frame segment based on the change in the object's position relative to a previous frame.

In a second specific example as shown in FIG. 13, the frame subset (and/or crop region) can be determined by tracking a change in the position of the feature (e.g., between frames acquired for a camera of the camera array) and determining (e.g., estimating) an updated pixel location and/or frame subset for the feature based on the change in position of the feature. This can be performed using frame differencing methods, motion estimation, and/or other methods.

However, the crop region location and/or size can be determined in any suitable manner.

In an illustrative example, S230 includes: identifying a reference image; detecting a feature of interest within the reference image; determining a reference frame subset (crop region) based on the location of the feature of interest within the reference image; for each of a set of target images, transforming the reference frame subset into a target frame subset (e.g., rotating and translating the crop region within the reference image into a corresponding crop region within the target image) using the respective camera's transformations (e.g., determined during calibration); and cropping each target image using the respective target frame subset.

In a second illustrative example, S230 includes: identifying a reference image; detecting a feature of interest within the reference image; determining a reference frame subset (crop region) based on the location of the feature of interest within the reference image; for each of a set of target images, transforming the target image into the reference image's frame of reference (e.g., rotating and translating the target image) using the respective camera's transformations (e.g., determined during calibration); and cropping each target image using the reference frame subset to obtain target frame subsets.

In a third illustrative example, S230 includes: determining (e.g., tracking) an object's location in real space; determining a frame subset (crop region) for one or more image (e.g., reference image, non-reference image) based on the object's location; and cropping each image based on the crop region. In this illustrative example, the non-reference images and/or non-reference image segments can be transformed into the reference image and/or image segment frame of reference.

However, S230 can include any suitable steps.

Compressing the frames functions to reduce the size of each image (e.g., acquired image, processed image, cropped images, frame subsets, etc.) of the subset of images. The compression is preferably lossless, but can be lossy. In specific examples, the compressed image can be stored in raster format, vector format, video formats (e.g., H.262 (MPEG-2 Part 2), MPEG-4 Part 2, H.264 (MPEG-4 Part 10), HEVC (H.265), Theora, RealVideo RV40, VP9, AV1, etc.), compound formats, stereo formats, and/or in any suitable format. In some variants, frames acquired by the same camera can be efficiently (e.g., to generate small file sizes) compressed using redundant information relative to prior and/or subsequent frames acquired by the same camera. These variants can be particularly, but not solely, beneficial for embodiments where each camera of the camera array includes a distinct camera computing system. In related variants, images from the set of images can be efficiently (e.g., to generate small file sizes) compressed using redundant information in the scene from images acquired by other cameras (e.g., adjacent cameras) of the camera array. These variants can be particularly, but not exclusively, beneficial for storing and/or transmitting the set of images and/or lightfield frames. However, the images and/or frames can be compressed in any manner.

Adjusting a focus of the image functions to ensure that the feature is in focus within the image. Adjusting a focus of the image can include deblurring, blurring, sharpening, adjusting a sharpness and/or contrast, and/or otherwise modify an image to ensure that the feature remains in focus.

Transmitting the images S240 preferably functions to transmit one or more images (e.g., the set of images acquired in S220, the set of processed images generated in S230, a subset of the set of images acquired in S220, a subset of the set of processed images generated in S230, etc.) to one or more receiver. Each image is preferably transferred to the same receiver, but each image can be transmitted to any suitable receiver. The receiver can include: a computing system (e.g., a central computing system, cloud computing system, display computing system, etc.), a display, a storage module, a database, and/or any suitable receiver. Each image is preferably transmitted by the camera computing system associated with the image to the central computing system. However, one or more images can be transmitted by any suitable transmitter and/or to any suitable receiver. S240 is preferably performed after S230, but can be performed before S230 and/or at the same time as S230. Images can be transmitted concurrently and/or sequentially. In variants where one or more cameras are configured to acquire video, individual frames of the video can be transmitted, the entire video can be transmitted, and/or any suitable set of frames from the video can be transmitted.

In an illustrative example, each camera computing system transmits only the frame subset of the image (e.g., the cropped image, only pixels within the frame subset, etc.) associated with camera computing system to the central computing system. However, any images or portions thereof can be transmitted.

Figure 5:
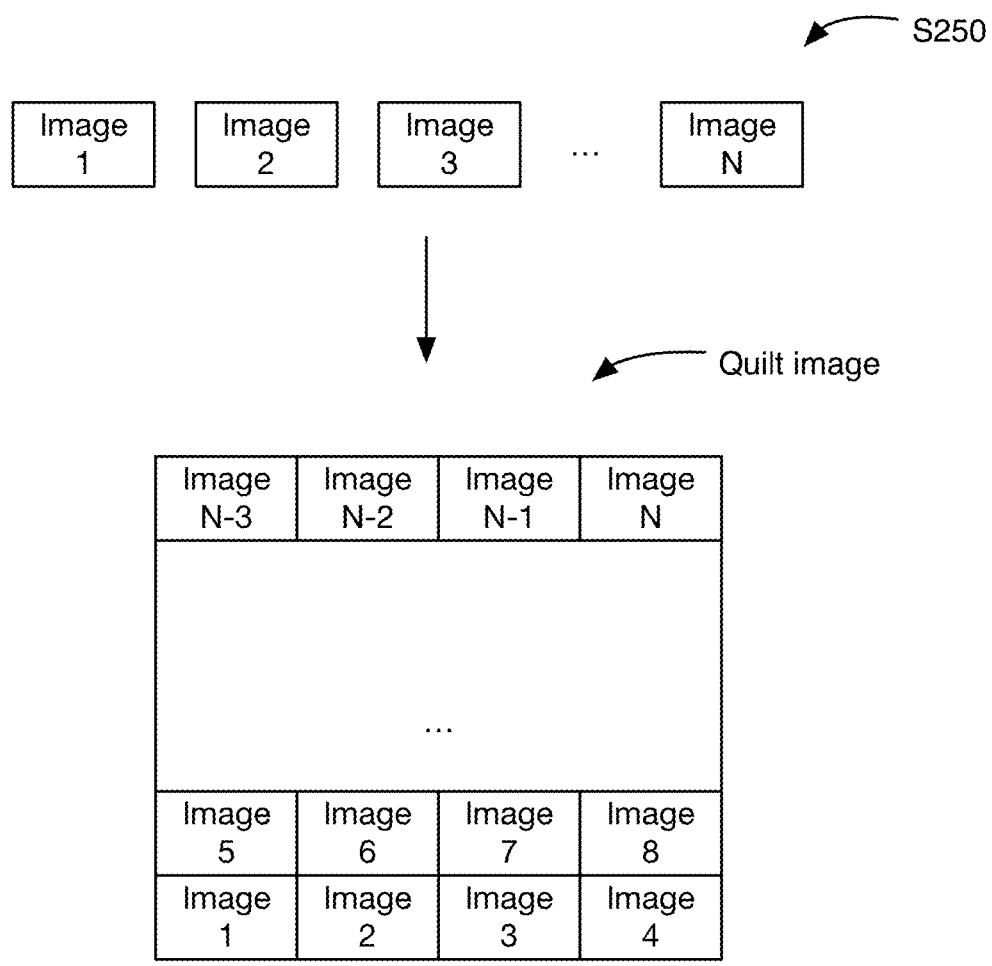
FIG. 5 is a schematic representation of an example of combining images to form a quilt image.

Generating a lightfield frame $S2_{50}$ preferably functions to create a lightfield frame from the images (e.g., set of images acquired in S220, subset of the set of images acquired in S220, set of processed images from S230, a subset of the set of processed images from S230, transmitted images from step S240, etc.). The lightfield frame is preferably formatted to be displayed as a holographic image of the scene (e.g., by the display), but can be formatted to be displayed as a 2D view of the scene, and/or formatted in any suitable manner. In a specific example, as shown in FIG. 5, the lightfield frame can be formatted as a quilt image, wherein the quilt image includes each image from the set of images. Within the quilt image, the set of images can be arranged in a raster (e.g., starting at the top left and rastering horizontally through images to the bottom right, starting at the top left and rastering vertically through images to the bottom right, starting at the bottom left of the quilt image and rastering horizontally through images to the top right, starting at the bottom left of the quilt image and rastering vertically through images to the top right, etc.), in a boustrophedon, randomly, and/or in any suitable order. The starting image can be associated with the first camera (e.g., wherein each camera is assigned a camera number), the left most camera of the camera array, the right most camera of the camera array, the center camera of the camera array, the top most camera of the camera array, the bottom most camera of the camera array, a random camera, and/or any suitable camera of the camera array. In an illustrative example, an images location in the quilt image depends on the location of the associated camera within the camera array. However, an image location within the quilt image can be otherwise determined. In variants including a quilt video, the quilt image corresponding to each frame of the lightfield video is preferably arranged in the same way, but can be arranged in different ways. However, the lightfield frame can be formatted as photosets, based on the display(s), and/or in any suitable format. Each image within a lightfield frame was preferably acquired during the same time window (e.g., within 1 ms, 10 ms, 16 ms, 30 ms, 50 ms, 100 ms, etc.), but one or more images within the lightfield frame can be acquired during any suitable time window.

S250 can be performed before, during, and/or after S240. S250 is preferably performed by a central computing system, but can be performed by any suitable computing system (e.g., a camera computing system, display computing system, cloud computing system, etc.) and/or component. Generating the lightfield frame can optionally include coordinating an audio file, applying a shader, setting a focus of the lightfield frame, storing the image(s), and/or any steps.

The lightfield frame associated with a given set of images is preferably generated before a second set of images (associated with a second time after the set of images was acquired) has been acquired. However, the lightfield frame can be generated before a second set of images has been transmitted (e.g., to the central computing system), before a second set of images has been processed, after a second of images has been acquired, after a second set of images has been transmitted to the central computing system, after a second set of images has been processed, and/or with any suitable timing.

S250 can optionally include coordinating an audio file (e.g., associated with sounds recorded from the scene) with the lightfield frame. The audio file is preferably synchronized (e.g., based on a timestamp of the audio file and the lightfield frame), but can be asynchronous.

Applying a shader functions to align the individual views (e.g., images within the lightfield frame) to hogel (e.g., holographic optical elements) locations of the display. Applying a shader can additionally or alternatively apply textures to modify and/or enhance the lightfield frame as displayed on the display. The shader can include pixel shaders, vertex shaders, geometry shaders, tessellation shaders, primitive shaders, and/or any suitable shader.

Setting a focus of the lightfield frame functions to ensure that the feature in the lightfield image is in focus. The focus of the lightfield frame is preferably determined (and/or set) by measuring a distance from the camera array to the feature of interest, but can be otherwise determined. The distance can be determined using a distance sensor (e.g., ultrasonic, infrared, etc.), using a disparity map (e.g., generated between two cameras of the camera array), and/or otherwise be determined.

Storing the image(s) functions to store the lightfield frame, the set of images, and/or the set of processed images such as to retrieve (and view) the images at a later time. The images are preferably stored in the storage module (e.g., of the computing system), but can be stored in any suitable location.

Displaying the lightfield frame S260 functions to display the lightfield frame of the scene. S260 is preferably preformed after S250, but can be performed at the same time as S250. S260 is preferably performed by one or more displays (e.g., a lightfield display), but can be performed by any suitable component. The displays can be local to the camera array and/or remote from the camera array. S260 preferably displays a holographic render of the scene, but can display a 2D render and/or any suitable representation. In variants corresponding to a lightfield video, each lightfield frame is preferably displayed at a frame rate substantially equal to (e.g., the same as, differing by at most 5%, 10%, 20%, etc.) the frame rate for the camera array (e.g., an average frame rate, a fastest frame rate, a slowest frame rate, etc. for one or more camera of the camera array). However, the lightfield frames can be displayed at any suitable frame rate. Displaying the lightfield frame can optionally include playing (e.g., synchronously, concurrently, etc.) an audio signal with the lightfield frame.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:
   a plurality of cameras comprising a reference camera and an auxiliary camera, each camera of the plurality of cameras configured to acquire an image of a scene from a different perspective relative to the other cameras of the plurality of cameras;
   a plurality of camera processors comprising a reference camera processor associated with the reference camera and an auxiliary camera processor associated with the auxiliary camera, wherein the reference camera processor is configured to:
      select a reference image segment from a reference image acquired by the reference camera, the reference image segment associated with a feature in the scene; and
      transmit the reference image segment to a central computing system;
   wherein the auxiliary camera processor is configured to:
      receive coordinates for the reference image segment associated with the reference camera;
      select an auxiliary image segment, from an auxiliary image acquired with the auxiliary camera, based on the coordinates and a pose of the auxiliary camera; and
      transmit the auxiliary image segment to the central computing system; and
   wherein the central computing system is configured to generate a holographic image from the reference image segment and the auxiliary image segment;
   wherein after generating the holographic image;
      the plurality of cameras are configured to acquire a second set of images;
      the reference camera processor is configured to:
         track a change in location of the feature between the reference image and a second reference image from the second set of images; and
         select a second reference image segment associated with the feature, wherein the second reference image segment is determined based on the change in location of the feature;
      the auxiliary camera processor is configured to select a second auxiliary image segment from an auxiliary image of the second set of images based on the change in location of the feature; and
      the central computing system is configured to generate a second holographic image using the reference image segment and the auxiliary image segment of the second set of images.

2. The system of claim 1, further comprising a lightfield display configured to display the holographic image.

3. The system of claim 2, further comprising a housing, wherein the plurality of cameras and the plurality of camera processors are mounted in the housing.

4. The system of claim 3, wherein the lightfield display and the central computing system are mounted in the housing.

5. The system of claim 1, wherein each camera processor of the plurality of camera processors comprises a microprocessor.

6. The system of claim 1, wherein the central computing system is configured to generate the holographic image before a camera of the plurality of cameras acquires a second image.

7. The system of claim 1, wherein the central computing system is further configured to interpolate between image segments associated with adjacent views of the scene, wherein the holographic image further comprises the interpolated views.

8. The system of claim 1, wherein the auxiliary camera processor is further configured to apply an affine transform to the auxiliary image, wherein the affine transformation is determined based on the auxiliary camera pose, and wherein the auxiliary image segment is selected from the transformed image.

9. The system of claim 8, wherein the affine transform comprises:
   a roll correction to correct for a roll of the auxiliary camera;
   at least one of a pitch correction or a yaw correction to correct for a pitch or a yaw of the auxiliary camera; and
   a translation correction to correct for a translation of the auxiliary camera.

10. The system of claim 1, further comprising a tracking sensor configured to track a motion of the feature, wherein the reference image segment is selected based on a predicted position of the feature determined from the motion of the feature.

11. A method for generating a holographic image of a scene, comprising:
   acquiring a reference image using a reference camera;
   acquiring a set of auxiliary images concurrently with acquiring the reference image, wherein each auxiliary image is acquired using a camera of a plurality of cameras;
   determining a feature in the reference image;
   selecting a reference image segment, associated with the feature, from the reference image;
   for each auxiliary image:
      transforming the respective auxiliary image based on a camera pose of the respective camera; and
      selecting an auxiliary image segment of the respective transformed image based on the respective camera pose and the reference image segment;
   transmitting the auxiliary image segments and the reference image segment to a central computing system;
   generating, at the central computing system, a holographic image using the auxiliary image segments and the reference image segment;
   after generating the holographic image, acquiring a second set of images;
   tracking a change in location of the feature between the reference image and a second reference image from the second set of images;
   selecting an image segment for each image of the second set of images, each image segment of the second set of images associated with the feature, wherein the image segments of each of the second set of images are determined based on the change in location of the feature; and
   generating a second holographic image using the image segments of the second set of images.

12. The method of claim 11, wherein transforming an auxiliary image comprises transforming the auxiliary image using an affine transformation.

13. The method of claim 12, wherein transforming the auxiliary image comprises:

applying a roll correction to correct for a roll of the respective camera;

applying at least one of a pitch correction or a yaw correction to correct for a pitch or yaw of the respective camera; and applying a translation correction to correct for a translation of the respective camera.

14. The method of claim 11, wherein generating the holographic image comprises setting a focus of the holographic image based on a distance between the plurality of cameras and the feature.

15. The method of claim 14, wherein the distance is determined by:

generating a disparity map using two images of the set of images; and determining the distance based on a separation distance between the cameras associated with the two images and the disparity map.

16. The method of claim 11, wherein generating the holographic image further comprises interpolating between two image segments, wherein the holographic image further comprises the interpolated image segments.

17. The method of claim 11, wherein each auxiliary image is associated with an auxiliary camera processor, wherein each auxiliary camera processor is configured to transform the respective auxiliary image and select the auxiliary image segment from the respective transformed image.

18. The method of claim 11, further comprising displaying the holographic image at a lightfield display.

19. A method for generating a holographic image of a scene, comprising:

acquiring a reference image using a reference camera;

acquiring a set of auxiliary images concurrently with acquiring the reference image, wherein each auxiliary image is acquired using a camera of a plurality of cameras;

determining a feature in the reference image;

selecting a reference image segment, associated with the feature, from the reference image;

for each auxiliary image:

transforming the respective auxiliary image based on a camera pose of the respective camera; and selecting an auxiliary image segment of the respective transformed image based on the respective camera pose and the reference image segment;

transmitting the auxiliary image segments and the reference image segment to a central computing system; and generating, at the central computing system, a holographic image using the auxiliary image segments and the reference image segment, wherein generating the holographic image comprises setting a focus of the holographic image based on a distance between the plurality of cameras and the feature, wherein the distance is determined by:

generating a disparity map using two images of the set of images; and determining the distance based on a separation distance between the cameras associated with the two images and the disparity map.

* * * * *